United States Patent
Ozawa

(10) Patent No.: US 9,169,415 B2
(45) Date of Patent: Oct. 27, 2015

(54) INK FOR INK-JET RECORDING APPARATUSES AND IMAGE FORMING METHOD

(71) Applicant: KYOCERA Document Solutions Inc., Osaka-shi (JP)

(72) Inventor: Noriaki Ozawa, Osaki (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 3 days.

(21) Appl. No.: 13/902,409

(22) Filed: May 24, 2013

(65) Prior Publication Data

US 2013/0321522 A1 Dec. 5, 2013

(30) Foreign Application Priority Data

May 29, 2012 (JP) .................................. 2012-122279

(51) Int. Cl.
- C09D 11/02 (2014.01)
- C09D 11/38 (2014.01)
- C09D 11/10 (2014.01)
- C09D 11/322 (2014.01)

(52) U.S. Cl.
CPC ............... *C09D 11/38* (2013.01); *C09D 11/10* (2013.01); *C09D 11/322* (2013.01)

(58) Field of Classification Search
CPC .............................. C09D 11/30; C09D 11/322
USPC ............................................. 106/31.89, 31.86
See application file for complete search history.

(56) References Cited

U.S. PATENT DOCUMENTS

| | | | |
|---|---|---|---|
| 6,051,057 A | 4/2000 | Yatake et al. | |
| 6,204,307 B1 * | 3/2001 | Miyabayashi | 523/160 |
| 6,730,155 B2 * | 5/2004 | Gotoh et al. | 106/31.86 |
| 6,749,675 B2 * | 6/2004 | Momose | 106/31.58 |
| 6,790,269 B2 * | 9/2004 | Nakatsu et al. | 106/31.59 |
| 6,830,612 B1 * | 12/2004 | Yatake et al. | 106/31.58 |
| 8,517,527 B2 | 8/2013 | Kojima et al. | |
| 8,651,650 B2 | 2/2014 | Matsuyama et al. | |
| 8,746,867 B2 | 6/2014 | Aoyama et al. | |
| 2006/0069182 A1 * | 3/2006 | Nakamura et al. | 523/160 |
| 2011/0169889 A1 | 7/2011 | Kojima et al. | |
| 2011/0205288 A1 | 8/2011 | Matsuyama et al. | |
| 2012/0052261 A1 | 3/2012 | Aoyama et al. | |

FOREIGN PATENT DOCUMENTS

| | | |
|---|---|---|
| JP | 2005-336496 A | 12/2005 |
| JP | 2006-282986 A | 10/2006 |
| JP | 2007-063454 A | 3/2007 |
| JP | 2010-070620 A | 4/2010 |
| JP | 2010-132855 A | 6/2010 |
| JP | 2012-051124 A | 3/2012 |

* cited by examiner

*Primary Examiner* — Veronica F Faison
(74) *Attorney, Agent, or Firm* — Knobbe Martens Olson & Bear LLP

(57) ABSTRACT

An ink for ink-jet recording apparatuses containing water and a pigment dispersion is provided in which a penetrating agent containing an alkane diol having 8 or 9 carbon atoms and a surfactant consisting of a compound represented by the following general formula (I) are blended in predetermined amounts.

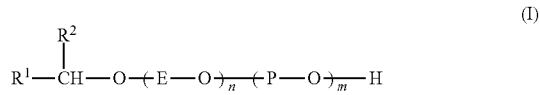

(I)

4 Claims, 4 Drawing Sheets

INK FOR INK-JET RECORDING APPARATUSES AND IMAGE FORMING METHOD

INCORPORATION BY REFERENCE

This application is based upon and claims the benefit of priority from the corresponding Japanese Patent Application No. 2012-122279, filed in the Japan Patent Office on May 29, 2012, the entire contents of which are incorporated herein by reference.

FIELD

The present disclosure relates to an ink for ink-jet recording apparatuses and an image forming method.

BACKGROUND

In recent years, highly precise and fine image quality comparative to silver salt photography can be taken along with rapid progress of recording technology; therefore, ink-jet recording apparatuses for forming images using an ink-jet recording system have been widely used as image forming apparatuses.

Concerning these ink-jet recording apparatuses, there is a strong desire to further increase image forming speed while maintaining image quality thereof. However, in the case of performing image formation at high speed using an ink-jet recording apparatus, the recording medium will be discharged by passing through the pair of discharge rollers prior to the ink penetrating the recording medium such as paper, whereby the ink may adhere to the discharge rollers (offset). In this case, the ink having adhered to the discharge rollers will adhere to the recording medium, whereby an image defect may occur in the formed image.

In order to suppress the occurrence of offset, it has been considered to reduce the ejected amount of ink. However, in this case, it is difficult to form an image with a desired image density. Therefore, in order to suppress the occurrence of offset while forming an image with a desired image density, several compounds have been considered that can improve the permeability of the ink to the recording medium by being contained in the ink.

In view of this situation, as an ink excelling in the permeability to a recording medium (drying characteristic) and that can form a high quality image, an ink has been proposed that contains a compound in which a specific amount of ethylene oxide and/or propylene oxide has been added to a linear alkanol.

However, in order to form a high quality image, generally, for the dots formed by ink droplets landing the recording medium, it is desirable for the dot diameter to be sufficiently large, and the dot shape to be close to a perfect circle. However, with the above-mentioned ink containing the specific compound, since it is difficult to form dots having a shape close to a perfect circle, it is difficult to form high quality images.

SUMMARY

An ink for ink-jet recording apparatuses according to one aspect of the present disclosure contains water, a pigment dispersion, a penetrating agent, and a surfactant consisting of a compound represented by the following general formula (I). The penetrating agent contains an alkane diol having 8 or 9 carbon atoms. The content of the alkane diol is from 0.3% by mass to 1.0% by mass relative to the total mass of ink. The content of the surfactant is from 0.05% by mass to 1.0% by mass relative to the total mass of ink.

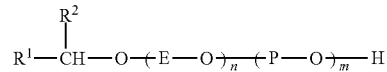

(I)

In the general formula (I),
$R^1$ is $C_A H_{2A+1}$,
$R^2$ is $C_B H_{2B+1}$,
A and B are each an integer of at least 1,
A+B is an integer of at least 6,
-E-O— is —$CH_2CH_2$—O—,
—P—O— is —$CH_2CH(CH_3)$—O—,
n and m are each a positive number,
n+m is at least 5,
n is greater than m, and
repeated sequences consisting (-E-O—) and (—P—O—) may be random or blocks.

An image forming method according to another aspect of the present disclosure is an image forming method including forming an image using the ink for ink-jet recording apparatuses as described in the first aspect, using an ink-jet recording apparatus.

DETAILED DESCRIPTION OF EMBODIMENTS

Figure 1:
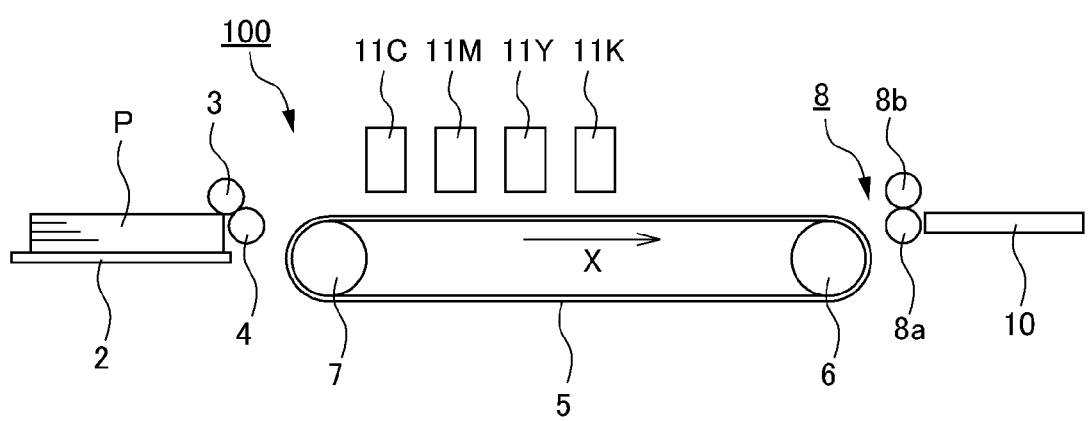
FIG. 1 shows a configuration of an ink-jet recording apparatus that employs a line head-type recording system.

The present disclosure is explained in detail with respect to embodiments below; however, the present disclosure is not limited at all to the embodiments below and may be carried out with appropriately making a change within the purpose of the present disclosure. In addition, explanation may be occasionally omitted with respect to duplicated matters; this does not however limit the gist of the present disclosure.

First Embodiment

An ink for ink-jet recording apparatuses of the first embodiment (hereinafter referred to simply as "ink") includes at least water, a pigment dispersion, a penetrating agent including an alkane diol having 8 or 9 carbon atoms, and a surfactant consisting of a compounds represented by formula (I). The ink contains the penetrating agent and surfactant in respective predetermined amounts. When using the ink of the first embodiment containing predetermined amounts of the aforementioned components, it is possible to form dots having the desired diameter and shape. First, the diameter of the dots formed using the ink of the first embodiment, and the shape thereof will be explained.

Dot Diameter and Dot Shape

Evaluation of the image quality of a formed image can be performed by evaluating the diameter of the dots (dot diameter) formed by ink droplets landing a recording medium, and the shape of the dots (dot shape). Generally, when forming an image with a predetermined resolution, the image quality of the formed image improves as the dot diameter increase to the extent possible. In addition, the image quality of the formed image improves as the dot shape approaches a perfect circle.

The dot diameter and shape index can be measured using a device such as a dot analyzer (e.g., DA-6000 by Oji Scientific Instruments). Measurement of the dot diameter and shape index using a dot analyzer is performed by binarizing a magnified image, photographed using a microscope, of an image formed using the ink at predetermined conditions, and then analyzing the dots included in the magnified image. By performing such measurement, it is possible to evaluate whether the dots formed using the ink have the desired diameter and shape.

The dot diameter is measured as an average value of the diameter of a plurality of dots within the formed image. The diameter of the dot is calculated in accordance with the following formula, based on the area of dots measured using the dot analyzer. The shape index is calculated as an average value of the shape index of a plurality of dots within the formed image. A case of the shape index of a dot being 1 indicates that the shape of this dot is a perfect circle. This indicates that the shape of the dot approaches a perfect circle as the shape index of the dot approaches 1. The shape index of each dot is calculated in accordance with the following formula based on the perimeter of the dot and the area of the dot measured using the dot analyzer.

(Dot Diameter Calculation Formula)

$$\text{Dot diameter} = (4 \times \text{dot surface area}/\pi)^{0.5}$$

(Dot Shape Index Calculation Formula)

$$\text{Dot shape index} = (\text{dot perimeter})^2 / (4\pi \times \text{dot surface area})$$

In a case of there being a hole not colored by ink inside of a dot, the perimeter of the hole is not included in the perimeter of the dot, and the area of the hole is not included in the area of the dot.

Next, the ink of the first embodiment will be explained in detail. The ink of the first embodiment contains water, a pigment dispersion, a penetrating agent, and a surfactant consisting of a compound represented by formula (I). The ink of the first embodiment may contain as necessary a dissolution stabilizer that stabilizes the state of dissolution of components contained in the ink, and a humectant that stabilizes the viscosity of the ink by suppressing volatilization of liquid components from the ink. The ink of the present disclosure contains pigment and resin as a pigment dispersion. Hereinafter, the essential or optional components of water, the pigment dispersion, penetrating agent, surfactant consisting of a compound represented by formula (I), dissolution stabilizer and humectant contained in the ink for ink-jet recording apparatuses, and a method of producing the ink for ink-jet recording apparatuses will be explained in order.

(Water)

The ink for ink-jet recording apparatuses of the present disclosure is a water-based ink, and essentially contains water. The water contained in the ink can employ water of a desired purity appropriately selected from water used in the manufacture of conventional water-based inks. The content of water in the ink for ink-jet recording apparatuses of the present disclosure is altered as appropriate depending on the amounts used of other components described later. The typical content of water in the ink is preferably from 20% by mass to 70% by mass relative to the total mass of ink, and is more preferably from 25% by mass to 60% by mass.

[Pigment Dispersion]

The ink for ink-jet recording apparatuses of the present disclosure contains a pigment dispersion that contains the pigment as a colorant and the resin.

(Pigment)

The pigments that can be contained in the pigment dispersion may be appropriately selected and used from pigments used as a colorant in conventional inks for ink-jet recording apparatuses. Specific examples of the pigment may be exemplified by yellow pigments such as C.I. pigment yellows 74, 93, 95, 109, 110, 120, 128, 138, 139, 151, 154, 155, 173, 180, 185, and 193; orange pigments such as C.I. pigment oranges 34, 36, 43, 61, 63, and 71; red pigments such as C.I. pigment reds 122 and 202; blue pigments such as C.I. pigment blues 15 and 15:3; violet pigments such as C.I. pigment violets 19, 23, and 33; and black pigments such as C.I. pigment black 7.

The amount of pigment used is preferably from 4% by mass to 8% by mass relative to the total mass of ink. When using an ink prepared using a pigment dispersion in which the amount of pigment used is too small, it is difficult to obtain an image having a desired image density. When using an ink prepared using a pigment dispersion in which the amount of pigment used is too great, the image density formed may fall below the desired value due to the fluidity of the ink being harmed, and image defects in the formed images may occur caused by offset caused by the decline in permeability of the ink to the recording medium.

From the viewpoint of color density, hue of the ink, and stability of the ink, the volume average particle diameter of pigment contained in the pigment dispersion is preferably from 30 nm to 200 nm, and more preferably from 70 nm to 130 nm. The volume average particle diameter of pigment can be adjusted by adjusting the particle diameter of beads used upon kneading the pigment and resin, and the processing time. In a case of using an ink prepared using a pigment dispersion containing pigment having an excessively small volume average particle diameter, the image density of the formed image may fall below the desired value. In a case of using an ink prepared using a pigment dispersion containing pigment having an excessively large volume average particle diameter, the ink ejection property may deteriorate from clogging of the nozzle ejecting the ink occurring. Using a sample prepared by diluting a pigment dispersion 300 times using ion exchange water, the volume average particle diameter of the pigment can be measured using a measuring device such as a dynamic light scattering-type particle size distribution analyzer (Sysmex Corp.).

(Resin)

The resin in the pigment dispersion can be appropriately selected and used from various resins used in the production of conventional pigment dispersions. Specific examples of preferable resins may be exemplified by styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid copolymers, styrene-maleic acid-acrylic acid alkyl ester copolymers, styrene-methacrylic acid copolymers, styrene-methacrylic acid alkyl ester copolymers, styrene-maleic acid half ester copolymers, vinylnaphthalene-acrylic acid copolymers, and vinylnaphthalene-maleic acid copolymers. Among these resins, in view of easy preparation and excellent effects in dispersing pigments, preferable are styrene-acrylic resins that include a unit derived from styrene and a unit derived from acrylic acid, methacrylic acid, acrylic acid ester, or methacrylic acid ester such as styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid-acrylic acid alkyl ester copolymers, styrene-methacrylic acid copolymers, and styrene-methacrylic acid alkyl ester copolymers.

The mass average molecular weight (Mw) of the resin used in the preparation of the pigment dispersion is preferably from 10,000 to 160,000. The mass average molecular weight (Mw) of the resin contained in the pigment dispersion can be measured employing gel filtration chromatography. The molecular weight of the above-mentioned resin can be adjusted in accordance with a known method of adjusting polymerization conditions such as the amount of polymerization initiator used, polymerization temperature, or polymerization time upon yielding a resin in a polymerization reaction. The amount of radical polymerization initiator is preferably added in from 0.001 mol to 5 mol per 1 mol of monomer mixture, and is more preferably added in from 0.01 mol to 2 mol. However, in a case of decreasing the amount of initiator, the polymerization reaction may stop and remaining monomer may increase. In addition, in the polymerization reaction, 2-mercaptoethanol may be used in a small amount (no more than 0.001 mol per 1 mol of monomer mixture) as a chain-transfer agent.

The acid value of the resin used in the preparation of the pigment dispersion is preferably from 150 mg KOH/g to 300 mg KOH/g. In the case of preparing a pigment dispersion using a resin having an excessively low acid value, it is difficult to favorably disperse the pigment in the pigment dispersion, and microparticulation of the pigment may become difficult. For this reason, in the case of using an ink prepared using such a pigment dispersion, the formed image may not have favorable colorability and chromogenic property. An ink prepared using a pigment dispersion containing a resin having an excessively high acid value may have low storage stability. The acid value of the resin can be adjusted by appropriately adjusting the amount used of monomer having an acidic functional group such as acrylic acid and methacrylic acid, upon synthesizing the resin. More specifically, the acid value of the resin can be raised by increasing the amount used of monomer having an acidic functional group.

Upon preparing the pigment dispersion, the resin is used in an amount in the range of from 15 parts by mass to 100 parts by mass, relative to 100 parts by mass of pigment.

(Method of Preparing Pigment Dispersion)

As a favorable method for preparing a pigment dispersion containing pigment and resin, a method may be exemplified where the pigment and the resin are kneaded in a suitable liquid medium like water using a wet-type media disperser such as a Nano Grain Mill (by Asada Tekko), an MSC Mill (by Mitsui Mining Co.), and a Dyno Mill (by Shinmaru Enterprises Co.) to prepare the pigment dispersion. Beads with a small diameter are used in the processing where the wet-type media disperser is employed. The particle diameter of the beads is preferably from 0.5 mm to 1.0 mm. A hard material such as zirconia may be used as the material of the beads.

The amount of liquid medium used to prepare the pigment dispersion is not particularly limited as long as the pigment and resin can be favorably kneaded. The amount of liquid medium used is preferably from 1 to 10 times, and more preferably from 2 to 8 times based on the total mass of the pigment and the resin.

[Penetrating Agent]

The ink for ink-jet recording apparatuses contains the penetrating agent in order to enhance permeability of the ink into recording media. The penetrating agent is an alkane diol having 8 or 9 carbon atoms. By using the ink containing an alkane diol having 8 or 9 carbon atoms as a penetrating agent, it is possible to form dots having a desired diameter and shape, and possible to form an image having the desired image density.

In contrast, an ink prepared using an alkane diol having 7 or less carbon atoms as the penetrating agent may be inferior in permeability to the recording media. For this reason, in the case of using an ink prepared using an alkane diol having 7 or less carbon atoms as the penetrating agent, it is difficult to form a dot having the desired diameter and shape, and difficult to form an image with the desired image density. In the case of preparing an ink using an alkane diol having 10 or more carbon atoms, the solubility of the alkane diol will be very low, and thus preparation of a uniformly mixed ink will be difficult.

The content of the alkane diol having 8 or 9 carbon atoms in the ink is from 0.3% by mass to 1.0% by mass. The ink prepared using an excessively small amount of the alkane diol having 8 or 9 carbon atoms will tend to have low permeability into the recording media. For this reason, in the case of using an ink in which the content of the alkane diol having 8 or 9 carbon atoms is too small, it is difficult to form dots having a shape close to a perfect circle. If the ink hardly penetrates into the recording media, the ink landing on the recording media will penetrate the recording media, while flowing irregularly on the recording medium, thereby causing dots having irregular shape to be formed. In addition, if the ink hardly penetrates the recording medium, it will be difficult to form an image having the desired image density. In the case of using an ink that hardly penetrates the recording media, offset may occur. If offset occurs, the ink on the recording medium will partially transfer to the discharge roller; therefore, the image density of the formed image may fall below the desired value.

In the case of using an ink with the content of the an alkane diol having 8 or 9 carbon atoms being excessively large, the permeability of the ink to the recording media may be too high; therefore, the ink landing the recording medium may quickly penetrate the recording medium. For this reason, the diameter of the formed dot tends to be small. In addition, in the case of the permeability of the ink into the recording media being too high, the pigment contained in the ink may also penetrate inside of the recording medium; therefore, it will be difficult to form an image with the desired image density.

The alkane diol is not particularly limited so long as the carbon number thereof is 8 or 9. The alkane diol may be a linear or branched chain. As specific examples of the alkane diol, alkane diols can be exemplified such as 1,2-octane diol, 1,2-nonane diol, 2-ethyl-1,3-hexane diol, 2-butyl-2-ethyl-1,3-propane diol, 2,2,4-trimethyl-1,3-pentane diol and 2,4-diethyl-1,5-pentane diol. Among these alkane diols, at least one compound selected from the group consisting of 1,2-octane diol, 2-ethyl-1,3-hexane diol, 2-butyl-2-ethyl-1,3-propane diol, 2,2,4-trimethyl-1,3-pentane diol and 2,4-diethyl-1,5-pentane diol are preferred. These alkane diols can be used by combining at least two or more types thereof.

The penetrating agent may include a combination of an alkane diol having 8 or 9 carbon atoms and various organic solvents used for the purpose of an improvement in the permeability of a conventional ink for ink-jet recording apparatuses. As specific examples of organic solvents that can be used along with the alkane diol having 8 or 9 carbon atoms, alkane diols having 7 or less carbon atoms such as 1,2-hexylene glycol, alkylene glycol monoalkyl ethers, dialkylene glycol monoalkyl ethers, trialkylene glycol monoalkyl ethers, and cyclic ketone compounds. In the case of using an alkane diol having 8 or 9 carbon atoms along with another penetrating agent, the total amount of penetrating agents used is more than 0.3% by mass relative to the total mass of ink, preferably from 1% by mass to 20% by mass, and more preferably from 5% by mass to 15% by mass.

[Surfactant]

The ink for ink-jet recording apparatuses of the first embodiment contains a surfactant consisting of a compound represented by the following general formula (I). As the surfactant, a plurality of the compounds represented by the following general formula (I) can be used by combining.

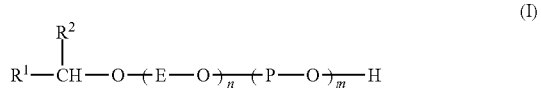

(I)

In general formula (I),
$R^1$ is $C_AH_{2A+1}$,
$R^2$ is $C_BH_{2B+1}$,
A and B are integers of at least 1,
A+B is an integer of at least 6,
-E-O is —$CH_2CH_2$—O—,
—P—O— is —$CH_2CH(CH_3)$—O—,
n and m are positive numbers,
n+m is at least 5,
n is greater than m, and
the repeated sequence consisting of (-E-O—) and (—P—O—) may be random or blocks.

By containing a surfactant consisting of a compound represented by general formula (I) in the ink, the wettability of the ink to the recording media is improved, and the ink tends to favorably penetrate into the recording media. By using the ink of the first embodiment, it is possible to form dots having the desired diameter and shape, and possible to form an image with the desired image density, due to the ink tending to favorably penetrate into recording media.

Even if a compound represented by the general formula (I), in a case of preparing an ink using a compound in which A+B is an integer less than 6, it will be difficult to obtain an ink excelling in wettability to the recording media. In addition, even if a compound represented by the general formula (I), in the case of using an ink prepared using a compound in which A+B is an integer less than 6, since the ink will hardly spread on the recording media, it will be difficult to form dots having the desired diameter and shape.

In the general formula (I), A+B is an integer of at least 6, and is preferably an integer of from 6 to 20, more preferably an integer of from 6 to 15, and particularly preferably an integer of from 6 to 10. In the case of preparing an ink using a compound represented by the general formula (I) in which A+B is an integer of from 6 to 20, a uniformly mixed ink can easily be prepared due to the compound represented by formula (I) having appropriate water solubility. In addition, when using an ink prepared using a compound represented by general formula (I) in which A+B is an integer of from 6 to 10, it is possible to favorably eject ink droplets from the recording head (nozzle), even in a case of forming an image after the recording head filled with ink has been left for a long time without capping.

A and B are not particularly limited so long as each is an integer of at least 1, and A+B is an integer of at least 6. With the condition of A+B being an integer of at least 6, A and B are preferably each from 1 to 13, and more preferably from 2 to 8.

In the general formula (I), n+m is at least 5, preferably from 5 to 12, and more preferably from 5 to 11. When using an ink prepared using a compound represented by general formula (I) in which n+m is from 5 to 11, it is possible to favorably eject ink droplets from the recording head, even in a case of forming an image after the recording head filled with ink has been left for a long time without capping. Even if a compound represented by the general formula (I), in a case of preparing an ink using a compound in which n+m is less than 5, it will be difficult to obtain an ink excelling in wettability to the recording media. Even if a compound represented by the general formula (I), in the case of using an ink prepared using a compound in which n+m is less than 5, the ink will hardly spread on the recording media. For this reason, it is difficult to form an image having dots of the desired diameter.

n and m are each positive numbers. n and m are each not particularly limited so long as n+m is at least 5 and m is less than n. With the condition of n+m being at least 5 and m being less than n, n is preferably from 2 to 11, and more preferably from 2 to 10. With the conditions of n+m being at least 5 and m being less than n, m is preferably from 1 to 6, and more preferably from 1 to 5.

Even if a compound represented by the general formula (I), an ink prepared using a compound in which n is no more than m will have low wettability to the recording media, and thus will hardly penetrate the recording media. In the case of using an ink that hardly penetrates the recording media, offset may occur. When offset occurs, the ink on the recording medium partially transfers to the discharge roller; therefore, the density of the formed image may fall below the desired value.

The content of surfactant in the ink is from 0.05% by mass to 1.0% by mass relative to the total mass of ink. In the case of using an ink having a content of surfactant that is too small, since the wettability of the ink to the recording media will be low, it may be difficult to form dots having the desired diameter, and difficult to form an image having the desired image density, for the aforementioned reasons. For an ink having a content of surfactant that is too large, the wettability to the recording media may be too high. In the case of the wettability of the ink to the recording media being too high, since the ink will quickly penetrate the recording media, dots of a smaller diameter than the desired diameter tend to be formed. In addition, in this case, since the pigment contained in the ink, as well as water and organic solvent contained in the ink, will penetrate inside of the recording media, it may be difficult to form an image having the desired image density.

The method of preparing a compound represented by the general formula (I) is not particularly limited. The compound represented by the general formula (I) can be prepared according to a conventional method by adding ethylene oxide and propylene oxide to the hydroxyl group of an alcohol represented the following general formula (II).

(II)

[Dissolution Stabilizer]

The dissolution stabilizer is a component that stabilizes a state of dissolved ink by compatibilizing the components in the ink. Specific examples of the dissolution stabilizer may be exemplified by 2-pyrrolidone, N-methyl-2-pyrrolidone, and γ-butyrolactone. These dissolution stabilizers may be used in a combination of two or more. When the ink contains the dissolution stabilizer, the content of the dissolution stabilizer is preferably from 1% to 20% by mass and more preferably from 3% to 15% by mass based on the total mass of the ink.

[Humectant]

The humectant is a component for stabilizing the viscosity of the ink by suppressing volatilization of liquid components from the ink. Specific examples of the humectant are polyalkylene glycols such as polyethylene glycol and polypropylene glycol; and alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol and 1,5-pentanediol, and glycerin. Among these humectants, glycerin is more preferable due to excelling in an effect of suppressing volatilization of liquid components such as water. As the humectant, two or more types can be combines for use. In the case of the ink containing a humectant, the content of humectant is preferably from 2% by mass to 30% by mass relative to the total mass of ink, and more preferably from 10% by mass to 25% by mass.

[Method of Producing Ink for Ink-Jet Recording Apparatuses]

The method of producing the ink for ink-jet recording apparatuses of the present disclosure is not particularly limited as long as capable of uniformly mixing water, the pigment dispersion, the penetrating agent, the humectant, and the surfactant consisting of a compound represented by formula (I) after adding a dissolution stabilizer and humectant to these ink components as necessary. A specific example of the method for producing the ink may be exemplified by a method of uniformly mixing every component of the ink by using a mixer, and then removing foreign matter and coarse particles by use of a filter with a pore size of 10 µm or less. In the processes of producing the ink, other liquid components other than organic solvents such as a dissolution stabilizer or various conventional additives that are added to inks for ink-jet recording apparatuses such as surfactants, anti-oxidants, viscosity modifiers, pH adjusters, and antibacterial/antifungal agents may be added to the water, the pigment dispersion, the humectant, the penetrating agent and the surfactant consisting of a compound represented by formula (I), as necessary. A surfactant other than the compound represented by the formula (I) may be included in the ink of the first embodiment.

When using the ink for ink-jet recording apparatuses of the above explained first embodiment, it is possible to form dots having the desired diameter and shape, and possible to form an image having the desired image density. For this reason, the ink for ink-jet recording apparatuses of the first embodiment can be suitably used in various ink-jet recording apparatuses.

Second Embodiment

The second embodiment relates to an image forming method for forming an image using the ink for ink-jet recording apparatuses of the first embodiment by an ink-jet recording apparatus. The recording system of the ink-jet recording apparatus, used in the image forming method of the second embodiment, may be a serial type in which recording is performed while scanning a recording head over a recording medium or a line head-type in which recording is performed using a recording head fixed to an apparatus main body. The ink-jet recording apparatus, used in the image forming method of the second embodiment, is preferably a recording apparatus of the line head-type from the viewpoint of higher speed in forming images and is more preferably a recording apparatus equipped with a long line head perpendicular to a recording medium conveying direction.

Figure 2:
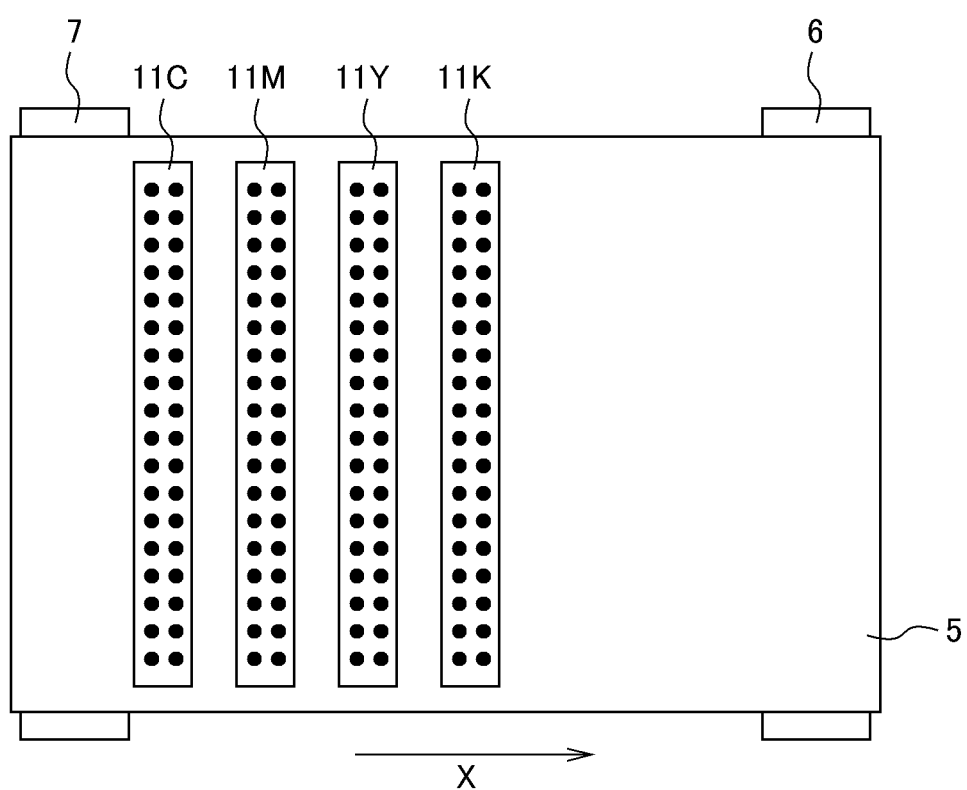
FIG. 2 is a view in which a conveyor belt of the ink-jet recording apparatus shown in FIG. 1 is viewed from above.

The image forming method of the second embodiment is explained with respect to the case of using a line head-type ink-jet recording apparatus where a recording paper P is used as a recording medium with reference to figures below. FIG. 1 is a cross-sectional view showing the configuration of a line head-type ink-jet recording apparatus; and FIG. 2 is a view of a conveyor belt, of the ink-jet recording apparatus shown in FIG. 1, viewed from above.

As shown in FIG. 1, a paper feed tray 2 (paper feed portion), where a recording paper P is stored, is provided on a left side of an ink-jet recording apparatus 100; and there are provided a paper feed roller 3 that feeds and conveys an uppermost recording paper P one by one in sequence to a conveyor belt 5 and a driven roller 4 that pressure-contacts with the paper feed roller 3 and is rotationally driven, at one end of the paper feed tray 2.

The conveyor belt 5 is rotatably arranged at a downstream side in a paper conveying direction X (right side in FIG. 1) of the paper feed roller 3 and the driven roller 4. The conveyor belt 5 is stretched over a belt drive roller 6 that is arranged on a downstream side in the paper conveying direction X and a belt roller 7 that is arranged at an upstream side. The belt roller 7 is driven to rotate with the belt drive roller 6 through the conveyor belt 5. The belt drive roller 6 is rotationally driven in a clockwise direction, whereby the recording paper P supported on the conveyor belt 5 is conveyed in the direction of the arrow X.

The belt drive roller 6 is arranged at a downstream side in the paper conveying direction X, thereby the paper feeding side (upwards in FIG. 1) of the conveyor belt 5 is pulled by the belt drive roller 6. Consequently, belt tension can be applied without slack, and thus the recording paper P can be stably conveyed. A sheet of a dielectric resin is used for the conveyor belt 5, and a structure without seams (seamless) is preferably used.

The ink-jet recording apparatus 100 may be provided with a heater (not illustrated) for heating the recording media for the purpose of accelerating the drying of ink. However, in the second embodiment, since the ink of the first embodiment excelling in permeability into the recording media is used, the ink quickly dries on the recording media and can form a favorable image, even without heating of the recording media. For this reason, the ink-jet recording apparatus 100 may be an apparatus not equipped with a heater.

In addition, a pair of discharge rollers (discharge portion) consisting of a discharge roller 8a and a driven roller 8b is provided on a downstream side of the conveyor belt 5 in the paper conveying direction X. The discharge roller 8a is driven clockwise in the drawing to discharge a recording paper P on which an image has been recorded to outside of the apparatus main body. The driven roller 8b is in pressure contact with the top of the discharge roller 8a to be driven to rotate. A paper ejection tray 10 on which recording paper P discharged out of the apparatus main body is stacked, is provided on a downstream side of the pair of discharge rollers 8 in the paper conveying direction X.

Since the driven roller 8b directly contacts the image forming surface of the recording paper P, it is preferable that the material of the surface of the driven roller 8b is a water-repellent material. Adhesion of the ink, which has not penetrated into the recording paper, to the rollers can be suppressed by making the surface of the driven roller 8b from the water-repellent material. Therefore, occurrence of offset can be easily suppressed. The preferable water-repellent material may be exemplified by fluorine resins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride and polyvinyl fluoride. Similarly to the driven roller 8$b$, the surface of the components directly contacting the image forming surface of the recording paper P is preferably made of the water-repellent material.

Above the conveyor belt 5, there are provided line heads 11C, 11M, 11Y, and 11K which are supported at a height such that a predetermined interval is maintained from the top surface of the conveyor belt 5 and which perform recording of images on the recording paper P conveyed on the conveyor belt 5. Colored inks of four different colors (cyan, magenta, yellow, and black) are filled in these line heads 11C to 11K, respectively. Color images are formed on the recording paper P by ejecting the respective colored inks from each of the line heads 11C to 11K.

In order to decrease the size of the apparatus, preferably, the period starting from the time when the ink droplets ejected from each of the line heads 11C to 11K have landed the recording paper P until the time when the ink landing locations on the recording paper P have reached the discharge portion 8 is within one second. Even in a case of setting such a period to within one second, the effect to suppress the occurrence of offset can be sufficiently exerted even when forming images rapidly by using the ink according to the first embodiment.

The ink amount of one or more colors that has been ejected from line heads 11C to 11K and has landed on the recording paper P may be adjusted to an amount where images with a desired image density can be formed and offset is unlikely to occur.

As shown in FIG. 2, these line heads 11C to 11K include nozzle arrays where a plurality of nozzles are arranged in a direction perpendicular to the paper conveying direction of the recording paper P (vertical direction in FIG. 2) and have a recording area of at least the width of the recording paper P; therefore, it is possible to form one-line images at once on the recording paper P conveyed by the conveying belt 5.

In the line head-type ink-jet recording apparatus of this embodiment, the line heads are configured to have a recording area of at least the width of the recording paper P by way of aligning a plurality of nozzles in the longitudinal direction of a long head body that is no shorter than the width of the conveyor belt 5. In this connection, the line heads may be configured such that two or more short head units, each having two or more nozzles, are aligned in the width direction of the conveyor belt 5 to record images over the entire width of the recording paper P.

Various systems may also be employed for the ink ejection system of the line heads 11C to 11K such as a piezoelectric element system for ejecting ink droplets using pressure occurring in liquid chambers of the line heads 11C to 11K using a piezoelectric element (not illustrated), a thermal ink-jet system for causing air bubbles to increase in pressure using a heating element to eject ink droplets, and the like. The ink ejection system is preferably a piezoelectric element system since the control of the ejected amount is easy.

Figure 3:
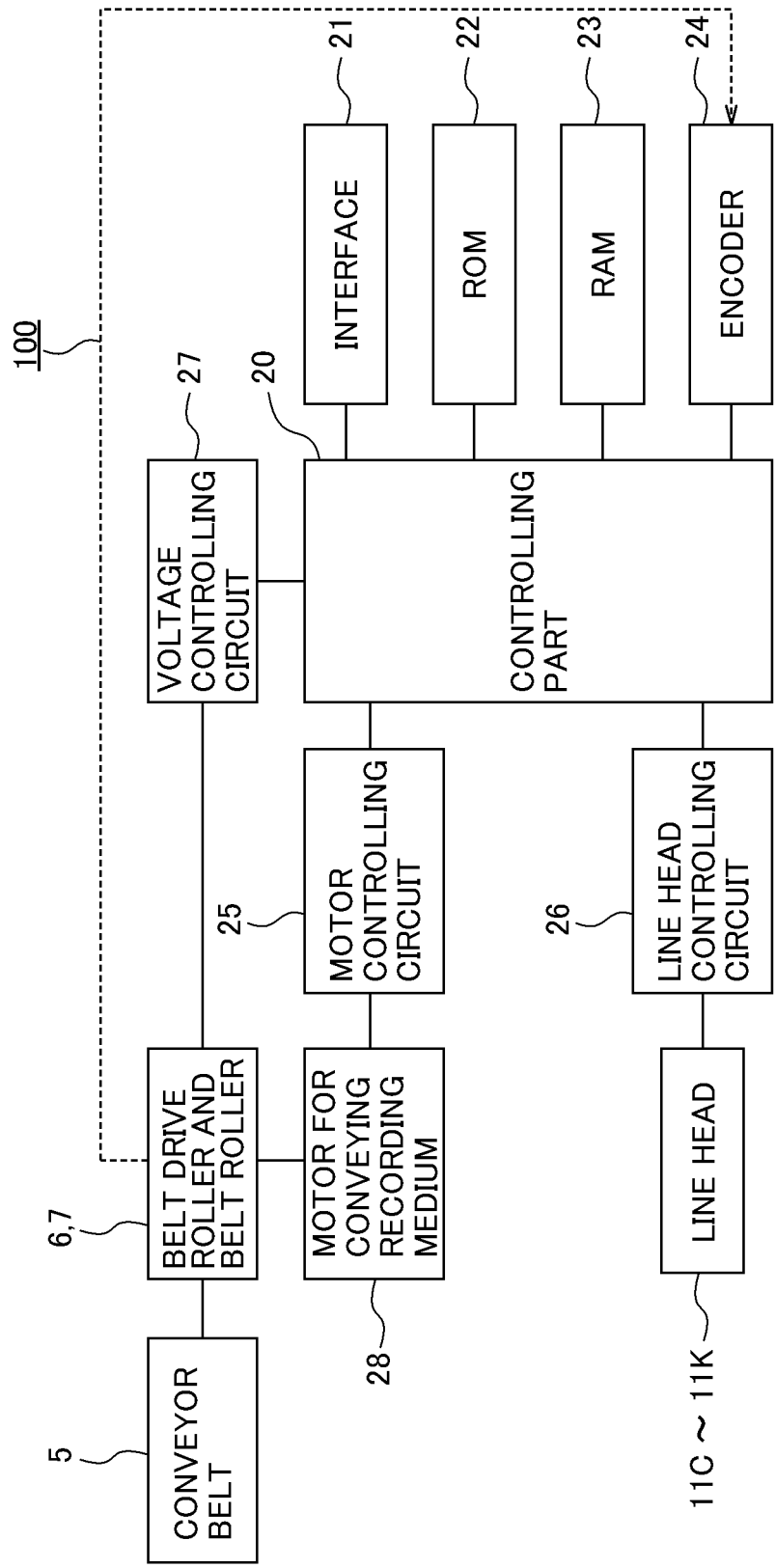
FIG. 3 is a block view showing a configuration of the line head-type ink-jet recording apparatus.

FIG. 3 is a view showing the configuration of an ink-jet recording apparatus of a line-head type recording system. The same reference symbols are appended to portions common between FIGS. 1 and 2, and explanations thereof will be omitted. A controlling part 20 is equipped to the ink-jet recording apparatus 100. An interface 21, a ROM 22, a RAM 23, an encoder 24, a motor controlling circuit 25, a line head controlling circuit 26, and a voltage controlling circuit 27 are connected to the controlling part 20.

The interface 21 transmits and receives data between a host device such as a personal computer (not shown). The controlling part 20 converts an image signal received via the interface 21 into image data by conducting magnification-changing processing or gradation processing as necessary. Then control signals are output to various controlling circuits described later.

The ROM 22 stores a program such as a control program for recording an image by driving the line heads 11C to 11K. The RAM 23 stores image data, having been magnification-changing processed or gradation processed by the controlling part 20, in a predetermined region.

The encoder 24 is connected to the belt drive roller 6 on a paper ejection side of driving the conveyor belt 5, and outputs a pulse train depending on the rotational displacement amount of the rotation axis of the belt drive roller 6. The controlling part 20 calculates the amount of rotation by counting the number of pulses sent from the encoder 24 to confirm the feed amount of the recording paper P (paper position). The controlling part 20 outputs a control signal to the motor controlling circuit 25 and line head controlling circuit 26 based on the signal from the encoder 24.

The motor controlling circuit 25 drives a recording medium conveying motor 28 based on the control signal from the controlling part 20. The conveyor belt 5 is rotated in the clockwise direction of FIG. 1 to convey the recording paper P in the direction of the arrow X, by the recording medium conveying motor 28 causing the belt drive roller 6 to be rotationally driven.

The line head controlling circuit 26 transfers image data stored in the RAM 23 to the line heads 11C to 11$k$ based on the control signal from the controlling part 20, and controls the ink ejection from the line heads 11C to 11K based on the transferred image data. Image formation on the recording paper P is performed according to the control described above as well as the conveyance control of the recording paper P through the conveyor belt 5 driven by the recording medium conveying motor 28.

The voltage controlling circuit 27 produces an alternating electric field by applying a voltage to the belt roller 7 on the paper feed side based on the control signal from the controlling part 20, thereby statically attracting the recording paper P to the conveyor belt 5. The static attraction is released by grounding the belt roller 7 or belt drive roller 6 based on the control signal from the controlling part 20. Here, the voltage is applied to the belt roller 7 on the paper feed side, but the voltage may be applied to the belt drive roller 6 on the paper ejection side.

A method of forming dots using the line head-type ink-jet recording apparatus is specifically explained with reference to FIG. 4. Among the line heads 11C to 11K shown in FIGS. 1 and 2, the line head 11C is explained as an example with reference to FIG. 4; however, other line heads 11M to 11K can be explained fairly similarly thereto.

Figure 4:
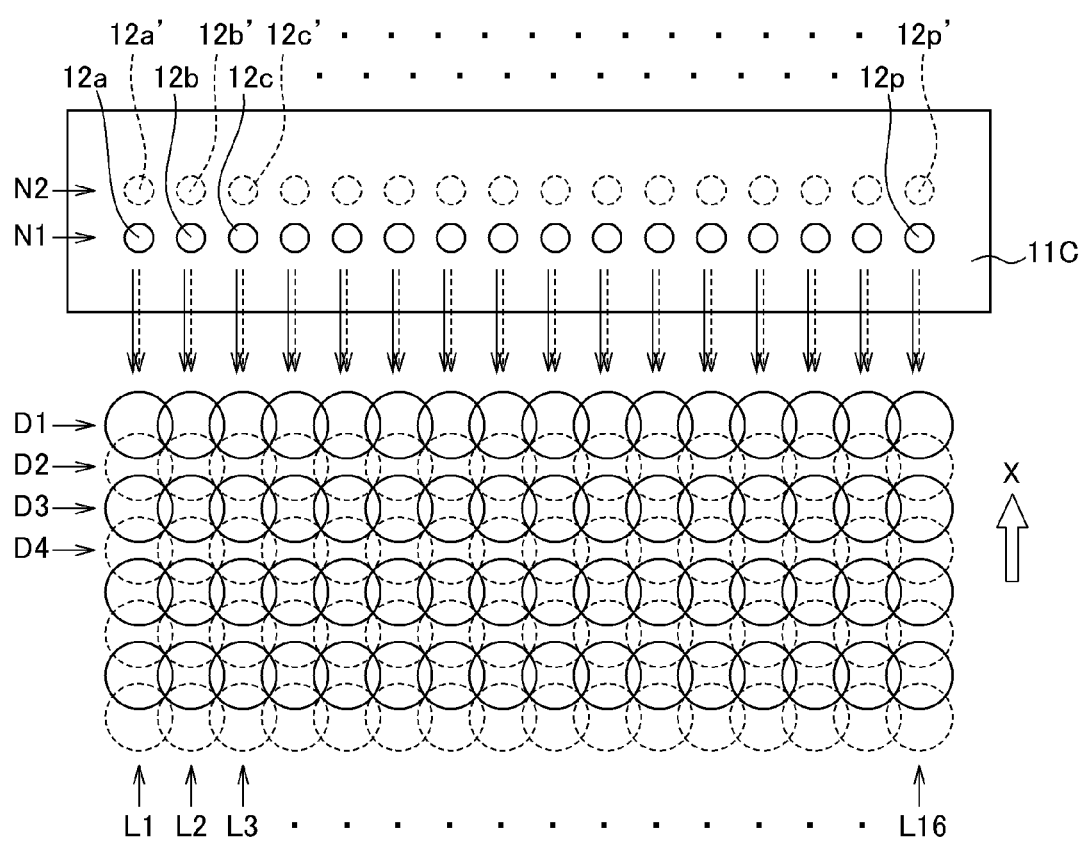
FIG. 4 is a plain view showing a line head used in the line head-type ink-jet recording apparatus and a part of dot lines formed on a recording paper.

As shown in FIG. 4, in the line head 11C, the nozzle arrays N1 and N2 consisting of a plurality of nozzles are arranged in parallel to the conveying direction (direction of arrow X) of recording paper P. That is, a total of two nozzles are provided to each of the nozzle arrays N1 and N2 (nozzles 12$a$ and 12$a'$ corresponding to a dot array L1) as the nozzles that form each dot array in the paper conveying direction X. Here, for convenience of explanation, although only the 16 nozzles of 12$a$ to 12$p$ and 12$a'$ to 12$p'$ corresponding to the dot arrays L1 to L16 are described among the nozzles of the nozzle arrays N1 and N2; actually, still more nozzles are arranged in a direction orthogonal to the conveying direction of the recording paper P.

Images are formed on the recording paper P as a recording medium using the nozzle arrays N1 and N2 in series. After forming the dot array D1 of one line in the width direction (left-right direction in drawing) of the recording paper P by ejecting ink from the nozzle array N1 (solid arrow in drawing) while moving the recording paper P in the conveying direction of the recording paper P, a subsequent dot array D2 of one line is formed by ejecting ink from the nozzle array N2 (dotted arrow in drawing), and then a subsequent dot array D3 of one line is further formed by ejecting ink from the nozzle array N1 again. Thereafter, dot arrays D4 and the following are similarly formed by alternately using the nozzle arrays N1 and N2.

With the image forming method of the above explained second embodiment, it is possible to form dots having the desired diameter and shape, and thus possible to form an image having the desired image density. For this reason, the image forming method of the second embodiment can be suitably applied to various ink-jet recording apparatuses.

EXAMPLES

The present disclosure is explained more specifically with reference to examples below. In addition, the present disclosure is not limited to the examples.

Preparation Example 1

Preparation of Styrene-Acrylic Resin

The styrene-acrylic resin used in the preparation of the pigment dispersion was produced by the following sequence.

To a 1000 mL four-necked flask provided with a stirrer, nitrogen-introducing tube, condenser and dropping funnel, 100 g of isopropyl alcohol and 300 g of methyl ethyl ketone were added. In a state heated to 70° C. and refluxing the contents of the flask while bubbling with nitrogen gas, a mixed solution consisting of 40 g of methyl methacrylate, 40 g of styrene, 10 g of butyl acrylate, 10 g of methacrylic acid and 0.4 g of azobisisobutyronitrile (AIBN, initiator) was added dropwise over about 2 hours into the flask using a dropping funnel. After adding dropwise, the mixed liquid in the flask was further heated and refluxed for 6 hours. Next, a methyl ethyl ketone solution containing 0.2 g of AIBN was added dropwise into the flask over 15 minutes at the same temperature. Subsequently, the mixed liquid in the flask was further heated and refluxed for 5 hours to obtain a styrene-acrylic resin with a molecular weight of 20,000. The weight average molecular weight of the styrene-acrylic resin obtained was confirmed under the following conditions using a gel filtration chromatograph (HLC-8020GPC, by Tosoh Co.). The acid value of the obtained resin was confirmed by titration as 100 mg KOH/g.

Measurement Conditions of Weight Average Molecular Weight

Column: TSKgel, Super Multipore HZ-H (4.6 mm ID×15 cm, by Tosoh Co.)
Number of columns: 3
Eluent: tetrahydrofuran
Flow rate: 0.35 mL/min
Amount of injected sample: 10 µL
Measurement temperature: 40° C.
Detector: IR detector A calibration curve was prepared on the basis of 8 types of F-40, F-20, F-4, F-1, A-5000, A-2500, A-1000, and n-propylbenzene selected from reference standards (TSK standard, polystyrene, by Tosoh Co.).

Preparation Example 2

Preparation of Pigment Dispersion

P.B-15:3 was used as the cyan pigment. Relative to the total mass of material used in the preparation of the pigment dispersion, 15.0% by mass of pigment, 6.0% by mass of the styrene-acrylic resin obtained in Preparation Example 1, 0.2% by mass of 1,2-octane diol, and the remaining water (ion exchange water) were introduced into a Dyno Mill (Multi-purpose laboratory, vessel volume 0.6 L, by Shinmaru Enterprises Co.). Next, sodium hydroxide of an amount required in neutralization of the styrene-acrylic resin was added to the Dyno Mill. Subsequently, zirconia beads with a diameter of 0.5 mm as a media were filled into the Dyno Mill so as to be 70% of the vessel volume, the pigment and styrene-acrylic resin were kneaded under conditions of 10° C. and circumferential velocity of 8 m/sec, while water cooling, thereby obtaining the pigment dispersion. It should be noted that the styrene-acrylic resin obtained in Preparation Example 1 was neutralized by an aqueous NaOH solution with a neutralization equivalent of 105%. The mass of Na was calculated as the mass of resin, and the mass of water contained in the aqueous NaOH solution and water generated in the neutralization reaction was calculated as the mass of ion exchange water. The obtained pigment dispersion was diluted to 300 times with ion exchange water, and the volume average particle diameter D50 of the pigment was measured by a dynamic light scattering-type particle size distribution analyzer (Zeta-sizer Nano, by Sysmex Co.), whereby the volume average particle diameter of the pigment was confirmed to be in the range of from 70 nm to 130 nm.

Examples 1 to 5 and Comparative Example 1

For Examples 1 to 5 and Comparative Example 1, inks were prepared using the penetrating agents listed in Table 1. More specifically, after the materials of the below composition 1 were uniformly mixed by agitating at a revolution speed of 400 rpm using an agitator (Three-One Motor, BL-600, by AS ONE Co.), it was filtered using a filter with a pore size of 5 µm to obtain the inks of Examples 1 to 5 and Comparative Example 1. As the surfactant, a surfactant 11 was used, which is a compound represented by the following formula (II).
(Composition 1)
Pigment dispersion obtained in Preparation Example 2: 40% by mass
Triethylene glycol monobutyl ether: 4.5% by mass
2-pyrrolidone (dissolution stabilizer): 5.0% by mass
Surfactant 11: 0.5% by mass
Penetrating agent of type listed in Table 1: 0.5% by mass
Glycerin: 15% by mass
1,3-propane diol: 15% by mass
Ion exchange water: balance

TABLE 1

| Penetrating agent | Compound | Carbon number |
|---|---|---|
| A | 1,2-heptane diol | 7 |
| B | 1,2-octane diol | 8 |

TABLE 1-continued

| Penetrating agent | Compound | Carbon number |
|---|---|---|
| C | 2-ethyl-1,3-hexane diol | 8 |
| D | 2-butyl-2-ethyl-1,3-propane diol | 9 |
| E | 2,2,4-trimethyl-1,3-pentane diol | 8 |
| F | 2,4-diethyl-1,5-pentane diol | 9 |

The inks of Examples 1 to 5 and Comparative Example 1 were evaluated with respect to the dot diameter and dot shape of dots included in the formed image, image density of the formed image, and decap property, according to the following methods. The evaluation results of Examples 1 to 5 and Comparative Example 1 of dot diameter and dot shape, image density of formed image and decap property are shown in Table 2.

Evaluation Method of Dot Diameter and Dot Shape

An image formed using an image forming apparatus (line head-equipped ink-jet recording apparatus, test model by Kyocera Document Solutions) as the evaluation device under a 25° C. and 50% RH environment was used as a measurement sample. Evaluation of dot diameter and dot shape was performed for dots included in the image that was the measurement sample. Plain paper (A4, IJW by Oji Paper Co., Ltd.) for ink jet was used as the recording medium. The amount of ink ejected from the recording head to the recording medium was set to 8 pL (per pixel) and the dot density was set to 600 dpi, and then a stamp image (image formed by ejecting ink of an amount corresponding to 1 dot from each nozzle of the line head) was formed on the recording medium. Using the obtained stamp image as a test sample, and using a dot analyzer (DA-6000, by Oji Scientific Instruments), the dot diameter, which is the diameter of each dot, and the shape index, which is an index of the dot shape, were measured. The values of the dot diameter and shape index employed average values of the measured values of 10 dots in the stamp image measured using the dot analyzer. The dot diameter and shape index (dot shape) were evaluated according to the following criteria.

<<Dot Diameter>>
 OK: 80 μm or larger
 NG: less than 80 μm
<<Shape Index (Dot Shape)>>
 OK: 2.5 or less
 NG: more than 2.5

Evaluation Method of Image Density

Evaluation of the image density was performed under a 25° C., 50% RH environment using the image forming apparatus employed as the evaluation device in the formation of images for evaluation of dot diameter and dot shape. Setting the amount of ink ejected from the recording head to the recording medium to 11 pL (per 1 pixel), a solid image of 10 cm×10 cm was formed using plain paper (A4, PPC paper, C2 by Fuji Xerox Co.) as the recording medium. The image density of the formed image was measured using a portable reflection densitometer (RD-19, by GretagMacbeth Co.). The average value for the image density at 10 locations in the solid image were defined as the image density. The image density was evaluated according to the following criteria.

OK: image density of 1.0 or higher
 NG: image density less than 1.0

Evaluation Method of Decap Property

The evaluation of decap property was performed under a 32.5° C., 15% RH environment using the same image forming apparatus and recording medium as the evaluation of image density. The ink was filled into the recording head, and after performing purge and wipe in sets three times, the recording head was left to stand for 60 minutes without capping. The purge amount was 2 cc per recording head at one time. After standing for 60 minutes, the amount of ink ejected from one nozzle of the recording head to the recording medium per 1 pixel was set to 11 pL, and a line image (width of one dot×length of the width of the recording medium) perpendicular to the moving direction of the recording medium was formed. The line image thus formed was observed to evaluate the decap property according to the following criteria.

OK: case where ejection of all nozzles could be confirmed
 NG: case confirming un-ejected ink, or displacement of ejection position of ink (displacement of at least 10 μm from line)

TABLE 2

| | Comp. ex. 1 | Ex. 1 | Ex. 2 | Ex. 3 | Ex. 4 | Ex. 5 |
|---|---|---|---|---|---|---|
| Penetrating agent | | | | | | |
| Type | A | B | C | D | E | F |
| Carbon number | 7 | 8 | 8 | 9 | 8 | 9 |
| Dot diameter (μm)/ Evaluation | 76/ NG | 85/ OK | 84/ OK | 83/ OK | 82/ OK | 84/ OK |
| Shape index/ Evaluation | 3.3/ NG | 2.1/ OK | 2.2/ OK | 1.6/ OK | 1.8/ OK | 2.1/ OK |
| Image density/ Evaluation | 0.95/ NG | 1.06/ OK | 1.01/ OK | 1.03/ OK | 1.02/ OK | 1.04/ OK |
| Evaluation of decap property | OK | OK | OK | OK | OK | OK |

From Table 2, it is understood that, in a case of using the inks of Examples 1 to 5 containing at least water, a pigment dispersion, a penetrating agent containing a predetermined amount of an alkane diol having 8 or 9 carbon atoms, and a predetermined amount of a surfactant consisting of a compound represented by the formula (I), it is possible to form dots having the desired diameter and shape, and possible to form an image with the desired image density.

From Comparative Example 1, it is understood that, in a case of using an ink containing 1,2-heptane diol, which is an alkane diol having 7 carbon atoms, as the penetrating agent, it is difficult to form an image having dots of the desired diameter and shape, and difficult to form an image with the desired image density. This is considered to be because the permeability of the ink to the recording medium is low.

Examples 6 to 8 and Comparative Examples 2 to 4

For Examples 6 to 8 and Comparative Examples 2 to 4, inks were prepared by adjusting the amount of penetrating agent B. More specifically, after the materials of the below composition 2 were uniformly mixed by agitating at a revolution speed of 400 rpm using an agitator (Three-One Motor, BL-600, by AS ONE Co.), it was filtered using a filter with a pore size of 5 μm to obtain the inks of Examples 6 to 8 and Comparative Examples 2 to 4. As the surfactant, a surfactant 12 was used, which is a compound represented by the following formula (12).

(Composition 2)
 Pigment dispersion obtained in Preparation Example 2: 40% by mass
 Triethylene glycol monobutyl ether: 4.5% by mass
 2-pyrrolidone (dissolution stabilizer): 5.0% by mass
 Surfactant 12: 0.5% by mass Penetrating agent B: amount shown in Table 3
Glycerin: 15% by mass
1,3-propane diol: 15% by mass
Ion exchange water: balance The inks of Examples 6 to 8 and Comparative Examples 2 to 4 were evaluated with respect to dot diameter and dot shape of dots included in the formed image, image density of the formed image, and decap property, similarly to Example 1. These evaluation results are shown in Table 3.

TABLE 3

|  | Comp. ex. 2 | Comp. ex. 3 | Ex. 6 | Ex. 7 | Ex. 8 | Comp. ex. 4 |
|---|---|---|---|---|---|---|
| Penetrating agent B(% by mass) | — | 0.2 | 0.3 | 0.5 | 1.0 | 1.2 |
| Dot diameter (μm)/ Evaluation | 82/ OK | 78/ NG | 83/ OK | 85/ OK | 81/ OK | 78/ NG |
| Shape index/ Evaluation | 3.9/ NG | 2.8/ NG | 2.2/ OK | 2.1/ OK | 1.8/ OK | 1.4/ OK |
| Image density/ Evaluation | 0.97/ NG | 0.98/ NG | 1.04/ OK | 1.06/ OK | 1.04/ OK | 0.98/ NG |
| Evaluation of decap property | OK | OK | OK | OK | OK | NG |

From Table 3, it is understood that, in a case of using the inks of Examples 6 to 8 containing at least water, pigment dispersion, a penetrating agent containing an alkane diol having 8 or 9 carbon atoms, and a predetermined amount of a surfactant consisting of a compound represented by the formula (I), and in which the content of the alkane diol having 8 or 9 carbon atoms is from 0.3% by mass to 1.0% by mass relative to the total mass of ink, it is possible to form dots having the desired diameter and shape, and possible to form an image with the desired image density.

From Comparative Examples 2 and 3, it is understood that, in a case of using an ink in which the content of the alkane diol having 8 or 9 carbon atoms in the ink is too small, it is difficult to form an image having dots of the desired shape, and difficult to form an image with the desired image density. This is considered to be because the permeability of the ink to the recording medium is low. From Comparative Example 4, it is understood that, in a case of using an ink in which the content of the alkane diol having 8 or 9 carbon atoms in the ink is too large, it is difficult to form an image having dots of the desired diameter, and difficult to form an image with the desired image density. This is considered to be because the permeability of the ink to the recording medium is too high; therefore, the ink landing on the recording medium quickly penetrates into the recording medium.

Examples 9 to 20 and Comparative Examples 5 to 17

For Examples 9 to 20 and Comparative Examples 5 to 17, inks were prepared respectively using compounds represented by the following formulas (1) to (19) as surfactants 1 to 19, olefin E1010 (surfactant, ethylene oxide (10 mol) adduct of acetylene diol, by Nissin Chemical Industry Co.) as a surfactant 20, and compounds represented by the following formulas (21) to (26) as surfactants 21 to 26. More specifically, after the materials of the below composition 3 were uniformly mixed by agitating at a revolution speed of 400 rpm using an agitator (Three-One Motor, BL-600, by AS ONE Co.), it was filtered using a filter with a pore size of 5 μm to obtain the inks of Examples 9 to 20 and Comparative Examples 5 to 17.

The surfactants 1 to 19 and 21 to 26 are compounds obtained by adding ethylene oxide and/or propylene oxide to alkanol. Hereinafter, for the surfactant, the carbon number and structure of the alkyl group derived from alkanol, and the addition number n of ethylene oxide and addition number m of propylene oxide in one molecule of surfactant are shown in the Table 4 to 9. In the case of the alkyl group derived from alkanol being a branched alkyl group, the values corresponding to A+B of the compounds represented by formula (I) are shown in Tables 4 to 9.

(Composition 3)
Pigment dispersion obtained in Preparation Example 2: 40% by mass
Triethylene glycol monobutyl ether: 4.5% by mass
2-pyrrolidone (dissolution stabilizer): 5.0% by mass
One of surfactants 1 to 26: 0.5% by mass
Penetrating agent B: 0.6% by mass
Glycerin: 15% by mass
1,3-propane diol: 15% by mass
Ion exchange water: balance

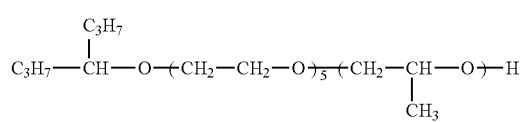

(1)

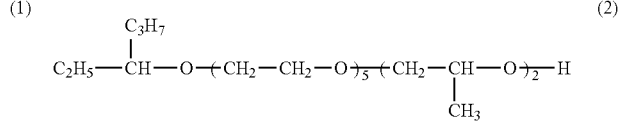

(2)

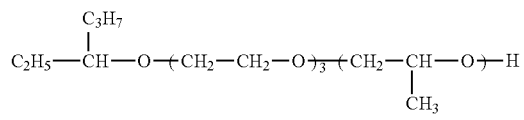

(3)

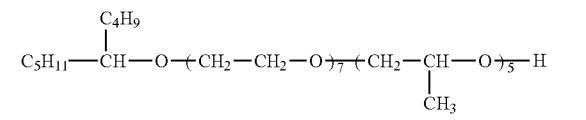

(4)

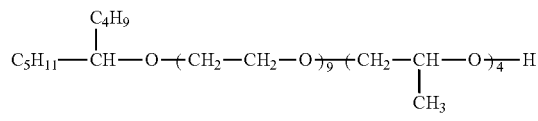

(5)

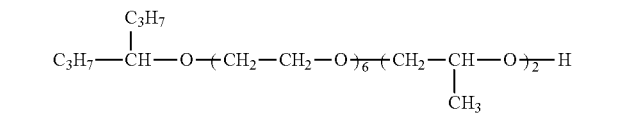

(6)

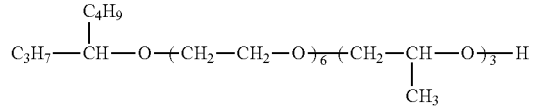

(7)

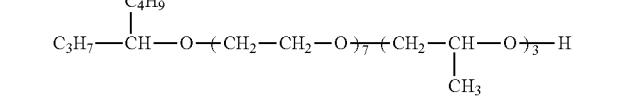

(8)

-continued
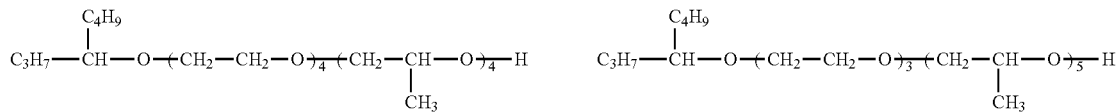
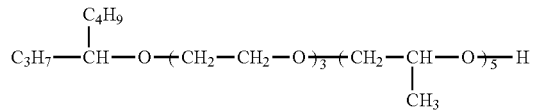
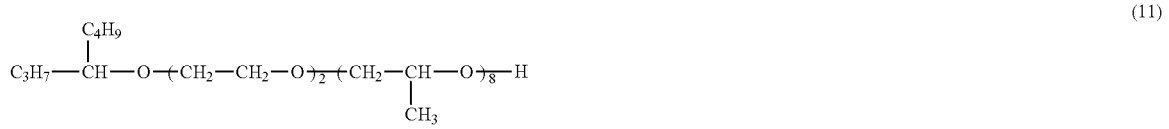
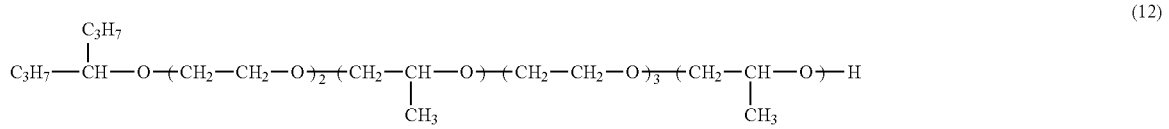
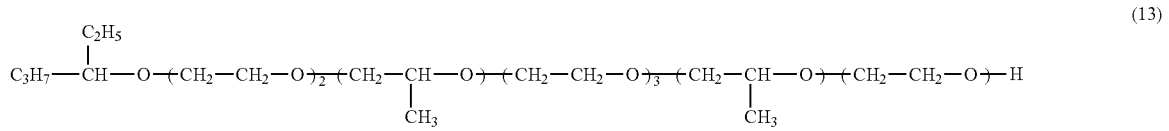
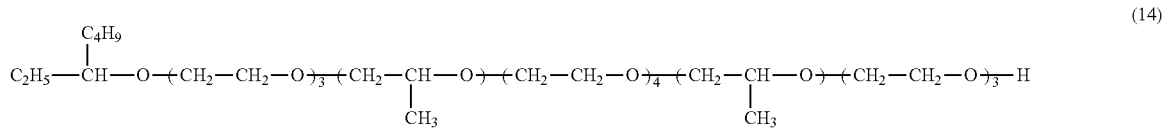
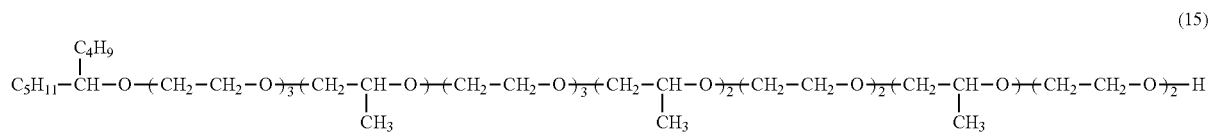
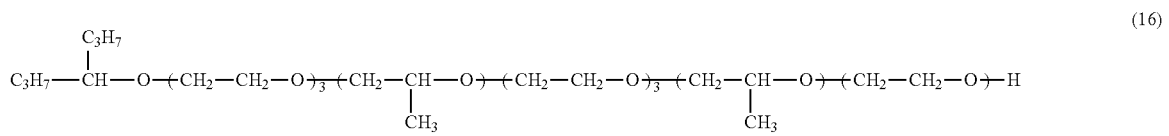
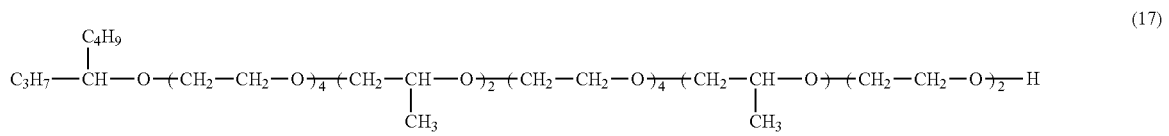
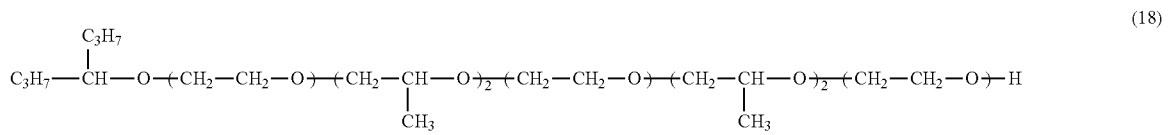
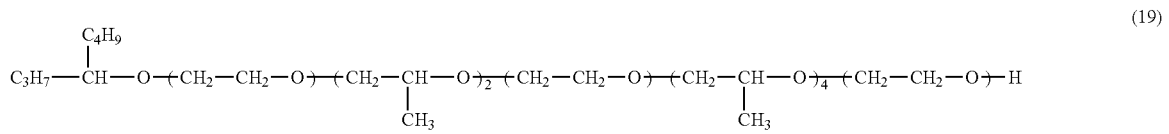

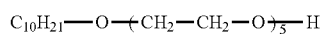  (21)

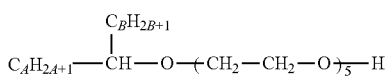  (22)

(A and B are integers of at least 1, and A+B is 12.)

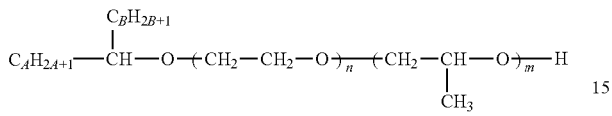  (23)

(A and B are integers of at least 1, A+B is from 11 to 12, n is 7, and m is from 2 to 3.)

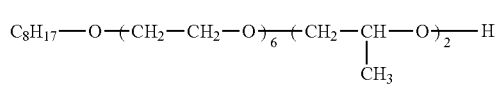  (24)

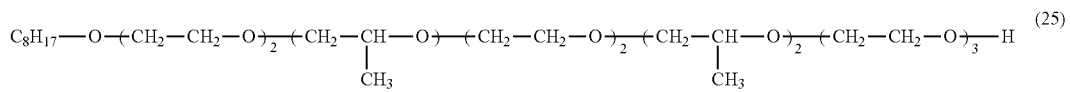  (25)

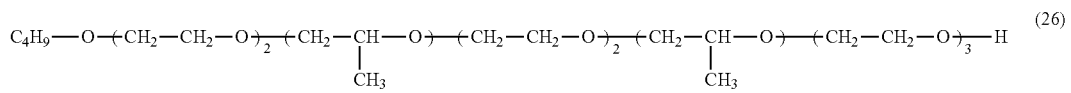  (26)

The inks of Examples 9 to 20 and Comparative Examples 5 to 18 were evaluated with respect to dot diameter and dot shape of dots included in the formed image, image density of the formed image, and decap property, similarly to Example 1. These evaluation results are shown in Tables 4 to 9.

TABLE 4

|  | Ex. 9 | Comp. ex. 5 | Comp. ex. 6 | Ex. 10 | Ex. 11 |
| --- | --- | --- | --- | --- | --- |
| Surfactant |  |  |  |  |  |
| Type | 1 | 2 | 3 | 4 | 5 |
| Structure of the alkyl group | Branched | Branched | Branched | Branched | Branched |
| Carbon number of the alkyl group | 7 | 6 | 6 | 10 | 10 |
| A + B | 6 | 5 | 5 | 9 | 9 |
| n | 5 | 5 | 3 | 7 | 9 |
| m | 1 | 2 | 1 | 5 | 4 |
| n + m | 6 | 7 | 4 | 12 | 13 |
| Dot diameter (μm)/ Evaluation | 83/ OK | 76/ NG | 76/ NG | 83/ OK | 80/ OK |
| Shape index/ Evaluation | 2.1/ OK | 3.3/ NG | 2.3/ OK | 2.2/ OK | 1.8/ OK |
| Image density/ Evaluation | 1.03/ OK | 1.00/ OK | 1.00/ OK | 1.02/ OK | 1.01/ OK |
| Evaluation of decap property | OK | OK | OK | OK | NG |

TABLE 5

|  | Ex. 12 | Ex. 13 | Ex. 14 | Comp. ex. 7 | Comp. ex. 8 | Comp. ex. 9 |
|---|---|---|---|---|---|---|
| Surfactant | | | | | | |
| Type | 6 | 7 | 8 | 9 | 10 | 11 |
| Structure of the alkyl group | Branched | Branched | Branched | Branched | Branched | Branched |
| Carbon number of the alkyl group | 7 | 8 | 8 | 8 | 8 | 8 |
| A + B | 6 | 7 | 7 | 7 | 7 | 7 |
| n | 6 | 6 | 7 | 4 | 3 | 2 |
| m | 2 | 3 | 3 | 4 | 5 | 8 |
| n + m | 8 | 9 | 10 | 8 | 8 | 10 |
| Dot diameter (μm)/Evaluation | 82/OK | 83/OK | 83/OK | 76/NG | 78/NG | 84/OK |
| Shape index/Evaluation | 2.0/OK | 1.9/OK | 2.1/OK | 1.4/OK | 1.8/OK | 3.9/NG |
| Image density/Evaluation | 1.00/OK | 1.02/OK | 1.01/OK | 0.98/NG | 0.97/NG | 0.93/NG |
| Evaluation of decap property | OK | OK | OK | OK | NG | NG |

TABLE 6

|  | Ex. 15 | Comp. ex. 10 | Ex. 16 | Ex. 17 |
|---|---|---|---|---|
| Surfactant | | | | |
| Type | 12 | 13 | 14 | 15 |
| Structure of the alkyl group | Branched | Branched | Branched | Branched |
| Carbon number of the alkyl group | 7 | 6 | 7 | 10 |
| A + B | 6 | 5 | 6 | 9 |
| n | 4 | 6 | 10 | 10 |
| m | 2 | 2 | 2 | 4 |
| n + m | 6 | 8 | 12 | 14 |
| Dot diameter (μm)/Evaluation | 85/OK | 78/NG | 87/OK | 86/OK |
| Shape index/Evaluation | 2.1/OK | 2.6/NG | 2.3/OK | 2.2/OK |
| Image density/Evaluation | 1.06/OK | 1.03/OK | 1.05/OK | 1.04/OK |
| Evaluation of decap property | OK | OK | OK | NG |

TABLE 7

|  | Ex. 18 | Ex. 19 | Comp. ex. 11 | Comp. ex. 12 |
|---|---|---|---|---|
| Surfactant | | | | |
| Type | 16 | 17 | 18 | 19 |
| Structure of the alkyl group | Branched | Branched | Branched | Branched |
| Carbon number of the alkyl group | 7 | 8 | 7 | 8 |
| A + B | 6 | 7 | 6 | 7 |
| n | 7 | 10 | 3 | 3 |
| m | 2 | 3 | 4 | 6 |
| n + m | 9 | 13 | 7 | 9 |
| Dot diameter (μm)/Evaluation | 87/OK | 86/OK | 81/OK | 84/OK |
| Shape index/Evaluation | 2.2/OK | 2.3/OK | 2.1/OK | 3.6/NG |
| Image density/Evaluation | 1.03/OK | 1.04/OK | 0.98/NG | 0.95/NG |
| Evaluation of decap property | OK | OK | NG | NG |

TABLE 8

|  | Comp. ex. 13 | Comp. ex. 14 | Comp. ex. 15 | Ex. 20 |
|---|---|---|---|---|
| Surfactant | | | | |
| Type | 20 | 21 | 22 | 23 |
| Structure of the alkyl group | — | Linear | Branched | Branched |
| Carbon number of the alkyl group | — | 10 | 13 | 12-13 |
| A + B | — | — | 12 | 11-12 |
| n | — | 5 | 5 | 7 |
| m | — | 0 | 0 | 2-3 |
| n + m | — | 5 | 5 | 9-10 |
| Dot diameter (μm)/Evaluation | 80/OK | 75/NG | 76/NG | 81/OK |
| Shape index/Evaluation | 3.1/NG | 2.1/OK | 2.0/OK | 2.0/OK |
| Image density/Evaluation | 1.02/OK | 0.98/NG | 1.03/OK | 1.01/OK |
| Evaluation of decap property | NG | NG | OK | NG |

TABLE 9

|  | Comp. ex. 16 | Comp. ex. 17 | Comp. ex. 18 |
|---|---|---|---|
| Surfactant | | | |
| Type | 24 | 25 | 26 |
| Structure of the alkyl group | Linear | Linear | Linear |
| Carbon number of the alkyl group | 8 | 8 | 4 |

TABLE 9-continued

|  | Comp. ex. 16 | Comp. ex. 17 | Comp. ex. 18 |
|---|---|---|---|
| A + B | — | — | — |
| n | 6 | 7 | 7 |
| m | 2 | 3 | 2 |
| n + m | 8 | 10 | 9 |
| Dot diameter (μm)/ Evaluation | 76/ NG | 78/ NG | 83/ OK |
| Shape index/ Evaluation | 1.8/ OK | 2.2/ OK | 3.1/ NG |
| Image density/ Evaluation | 1.01/ OK | 1.00/ OK | 0.95/ NG |
| Evaluation of decap property | NG | NG | OK |

From Tables 4 to 9, it is understood that, in a case of using the inks of Examples 9 to 20 containing at least water, a pigment dispersion, a penetrating agent containing a predetermined amount of an alkane diol having 8 or 9 carbon atoms, and a predetermined amount of a surfactant consisting of a compound represented by the formula (I), it is possible to form dots having the desired diameter and shape, and possible to form an image with the desired image density.

From Comparative Example 5, it is understood that, in a case of using an ink containing the surfactant 2 in which A+B is less than 6, it is difficult to form dots of the desired diameter and shape. This is considered to be because the wettability of the ink to the recording medium is poor, and thus the diffusion and permeation of the ink into the recording medium is slow.

From Comparative Example 6, it is understood that, in a case of using an ink containing the surfactant 3 in which n+m is less than 5, it is difficult to form dots of the desired diameter. This is considered to be because the wettability of the ink to the recording medium is poor, and thus the ink hardly diffuses at the surface of the recording medium.

From Comparative Examples 7 to 9, 11 and 12, it is understood that, in a case of using an ink containing surfactant 8 to 10, surfactant 18 and surfactant 19, in which n is no greater than m, it is difficult to form an image with the desired image density. In addition, although not necessarily applicable, from Comparative Examples 7 to 9, 11 and 12, it is understood that, in a case of using an ink containing a surfactant in which n is no greater than m, it is difficult to form dots having both diameter and shape of the desired extents.

Examples 21 to 24, Comparative Examples 19 and 20, Examples 25 to 27, and Comparative Examples 21 and 22

In Examples 21 to 24 and Comparative Examples 19 and 20, an ink was prepared by adjusting the amount of surfactant 12, which is a compound represented by formula (12), as the surfactant. More specifically, after the materials of the below composition 4 were uniformly mixed by agitating at a revolution speed of 400 rpm using an agitator (Three-One Motor, BL-600, by AS ONE Co.), it was filtered using a filter with a pore size of 5 μm to obtain the inks of Examples 21 to 24 and Comparative Examples 19 and 20.

(Composition 4)
Pigment dispersion obtained in Preparation Example 2: 40% by mass
  Triethylene glycol monobutyl ether: 4.5% by mass
  2-pyrrolidone (dissolution stabilizer): 5.0% by mass
  Surfactant 12: amount shown in Table 10
  Penetrating agent B: 0.6% by mass
  Glycerin: 15% by mass
  1,3-propane diol: 15% by mass
  Ion exchange water: balance In Examples 25 to 27 and Comparative Examples 21 and 22, an ink was prepared by adjusting the amount of surfactant 1, which is a compound represented by formula (I). More specifically, after the materials of the below composition 5 were uniformly mixed by agitating at a revolution speed of 400 rpm using an agitator (Three-One Motor, BL-600, by AS ONE Co.), it was filtered using a filter with a pore size of 5 μm to obtain the inks of Examples 25 to 27 and Comparative Examples 21 and 22.

(Composition 5)
Pigment dispersion obtained in Preparation Example 2: 40% by mass
  Triethylene glycol monobutyl ether: 4.5% by mass
  2-pyrrolidone (dissolution stabilizer): 5.0% by mass
  Surfactant 12: amount shown in Table 11
  Penetrating agent B: 0.6% by mass
  Glycerin: 15% by mass
  1,3-propane diol: 15% by mass
  Ion exchange water: balance The inks of Examples 21 to 24, Comparative Examples 19 and 20, Examples 25 to 27 and Comparative Examples 21 and 22 were evaluated with respect to dot diameter and dot shape of dots included in the formed image, image density of the formed image, and decap property, similarly to Example 1. The evaluation results of Examples 21 to 24, and Comparative Examples 19 and 20 are shown in Table 10. The evaluation results of Examples 25 to 27, and Comparative Examples 21 and 22 are shown in Table 11.

TABLE 10

|  | Comp. ex. 19 | Ex. 21 | Ex. 22 | Ex. 23 | Ex. 24 | Comp. ex. 20 |
|---|---|---|---|---|---|---|
| Content of surfactant (% by mass) | 0.03 | 0.05 | 0.20 | 0.50 | 1.00 | 1.20 |
| Dot diameter (μm)/ Evaluation | 76/ NG | 83/ OK | 86/ OK | 85/ OK | 83/ OK | 78/ NG |
| Shape index/ Evaluation | 2.6/ NG | 2.4/ OK | 2.2/ OK | 2.1/ OK | 2.1/ OK | 2.0/ OK |
| Image density/ Evaluation | 0.98/ NG | 1.04/ OK | 1.06/ OK | 1.06/ OK | 1.03/ OK | 0.98/ NG |
| Evaluation of decap property | OK | OK | OK | OK | OK | OK |

TABLE 11

|  | Comp. ex. 21 | Ex. 25 | Ex. 26 | Ex. 27 | Comp. ex. 22 |
|---|---|---|---|---|---|
| Content of surfactant (% by mass) | 0.03 | 0.05 | 0.50 | 1.00 | 1.10 |
| Dot diameter (μm)/ Evaluation | 78/ NG | 80/ OK | 81/ OK | 80/ OK | 78/ NG |
| Shape index/ Evaluation | 2.3/ OK | 2.2/ OK | 2.1/ OK | 2.2/ OK | 1.8/ OK |
| Image density/ Evaluation | 0.98/ NG | 1.01/ OK | 1.03/ OK | 1.00/ OK | 0.98/ NG |
| Evaluation of decap property | OK | OK | OK | OK | OK |

From Tables 10 and 11, it is understood that, in a case of using the inks of Examples 21 to 27 containing at least water, a pigment dispersion, a penetrating agent containing a predetermined amount of an alkane diol having 8 or 9 carbon atoms, and a predetermined amount of a surfactant consisting of a compound represented by the formula (I), it is possible to form dots having the desired diameter and shape, and possible to form an image with the desired image density.

From Comparative Examples 19 and 21, it is understood that, in a case of using an ink in which the content of surfactant in the ink is too small, it is difficult to form dots having the desired diameter, and difficult to form an image with the desired image density. This is considered to be because the wettability of the ink to the recording medium is poor, and thus it is difficult for the ink to quickly diffuse and penetrate the recording medium. A decline in the image density is considered to be caused by the occurrence of offset generated by the decline in the penetrating rate of the ink into the recording medium.

From Comparative Examples 20 and 22, it is understood that, in a case of using an ink in which the content of surfactant in the ink is too large, it is difficult to form dots having the desired diameter, and difficult to form an image with the desired image density. This is considered to be caused by the ink quickly penetrating the recording medium due to the wettability of the ink to the recording medium being too high.

Examples 28 and 29, and Comparative Examples 23 and 24

In Examples 28 and 29 and Comparative Examples 23 and 24, an ink was prepared by adjusting the respective amounts of surfactant 14, which is a compound represented by formula (13), surfactant 3, which is a compound represented by formula (3), and penetrating agent B. More specifically, after the materials of the below composition 6 were uniformly mixed by agitating at a revolution speed of 400 rpm using an agitator (Three-One Motor, BL-600, by AS ONE Co.), it was filtered using a filter with a pore size of 5 μm to obtain the inks of Examples 28 and 29, and Comparative Examples 23 and 24.
(Composition 6)
Pigment dispersion obtained in Preparation Example 2: 40% by mass
Triethylene glycol monobutyl ether: 4.5% by mass
2-pyrrolidone (dissolution stabilizer): 5.0% by mass
Surfactant 14: amount shown in Table 12
Surfactant 3: amount shown in Table 12
Penetrating agent B: amount shown in Table 12
Glycerin: 15% by mass
1,3-propane diol: 15% by mass
Ion exchange water: balance The inks of Examples 28 and 29, and Comparative Examples 23 and 24 were evaluated with respect to dot diameter and dot shape of dots included in the formed image, image density of the formed image, and decap property, similarly to Example 1. These evaluation results are shown in Table 12.

TABLE 12

|  | Comp. ex. 23 | Comp. ex. 24 | Ex. 28 | Ex. 29 |
|---|---|---|---|---|
| Surfactant 14 (% by mass) | 0.3 | 0.7 | 0.5 | 0.3 |
| Surfactant 3 (% by mass) | 0.3 | 0.7 | — | 0.3 |
| Penetrating agent B (% by mass) | — | — | 0.5 | 0.5 |
| Dot diameter (μm)/ Evaluation | 85/ OK | 82/ OK | 87/ OK | 85/ OK |
| Shape index/ Evaluation | 3.6/ NG | 3.1/ NG | 2.3/ OK | 2.1/ OK |
| Image density/ Evaluation | 0.96/ NG | 0.94/ NG | 1.04/ OK | 1.03/ OK |
| Evaluation of decap property | OK | OK | OK | OK |

From Table 12, it is understood that, in a case of using the inks of Examples 28 and 29 containing at least water, a pigment dispersion, a penetrating agent containing a predetermined amount of an alkane diol having 8 or 9 carbon atoms, and a predetermined amount of a surfactant consisting of a compound represented by the formula (I), it is possible to form dots having the desired diameter and shape, and possible to form an image with the desired image density.

From Comparative Examples 23 and 24, it is understood that, in a case of using an ink not containing an alkane diol having 8 or 9 carbon atoms, it is difficult to form dots having the desired shape, and difficult to form an image with the desired image density. This is considered to be because the permeability of the ink to the recording medium is low.

The invention claimed is:

1. An ink for ink-jet recording apparatuses comprising: water, a pigment dispersion containing a pigment and a resin as a polymeric dispersant, a penetrating agent, and a surfactant consisting of a compound represented by the following general formula (I),
    wherein the penetrating agent contains an alkane diol having 8 or 9 carbon atoms, and
    the alkane diol is at least one compound selected from the group consisting of 1,2-octane diol, 2-butyl-2-ethyl-1, 3-propane diol, and 2,4-diethyl-1,5-pentane diol,
    wherein the resin is a styrene-methacrylic acid-methacrylic acid alkyl ester-acrylic acid alkyl ester copolymer,
    wherein the ink comprises triethylene glycol monobutyl ether,
    wherein content of the alkane diol is in the range of 0.3% by mass to 1.0% by mass relative to the total mass of ink, and
    wherein content of the surfactant is in the range of 0.05% by mass to 1.0% by mass relative to the total mass of ink,

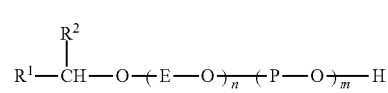

(I)

wherein, in the general formula (I),
$R^1$ is $C_AH_{2A+1}$,
$R^2$ is $C_BH_{2B+1}$,
A and B are each an integer of at least 1,
A+B is an integer of from 6 to 10,
-E-O— is —CH$_2$CH$_2$—O—,
—P—O— is —CH$_2$CH(CH$_3$)—O—,
n and m are each a positive number,
n+m is 5 to 12,
n is greater than m, and
a repeated sequence consisting (-E-O—) and (—P—O—) may be random or blocks.

2. An image forming method, comprising forming an image with the ink for ink-jet recording apparatuses according to claim 1, using an ink-jet recording apparatus.

3. The image forming method according to claim 2, wherein a recording medium is not heated when forming an image.

4. The image forming method according to claim 2, wherein a recording system of the ink-jet recording apparatus is a line-head type recording system.

* * * * *